(12) United States Patent
Wampler et al.

(10) Patent No.: US 7,062,351 B2
(45) Date of Patent: Jun. 13, 2006

(54) CLAMP AVOIDANCE CUTTER PATH REGENERATION

(75) Inventors: Robert R. Wampler, Augusta, KS (US); Troy L. Wampler, Derby, KS (US); Leonard A. Bailey, Andover, KS (US); Rodney L. Benson, Wichita, KS (US)

(73) Assignee: The Boeing Company, Chicago, IL (US)

(*) Notice: Subject to any disclaimer, the term of this patent is extended or adjusted under 35 U.S.C. 154(b) by 483 days.

(21) Appl. No.: 10/670,968

(22) Filed: Sep. 25, 2003

(65) Prior Publication Data

US 2005/0071041 A1 Mar. 31, 2005

(51) Int. Cl.
*G06F 19/00* (2006.01)

(52) U.S. Cl. ...................................... 700/178
(58) Field of Classification Search ................ 700/159, 700/160, 173–184
See application file for complete search history.

(56) References Cited

U.S. PATENT DOCUMENTS

| | | | | |
|---|---|---|---|---|
| 4,633,409 A | * | 12/1986 | Sekikawa | .................. 700/183 |
| 4,651,601 A | * | 3/1987 | Sasaki | ........................... 83/13 |
| 5,136,903 A | * | 8/1992 | Hibi | ............................ 82/1.11 |
| 5,416,715 A | * | 5/1995 | Kinoshita et al. | ........... 700/178 |
| 5,751,584 A | * | 5/1998 | Yuasa et al. | ................. 700/178 |
| 5,991,528 A | * | 11/1999 | Taylor et al. | ................... 703/6 |
| 6,438,445 B1 | * | 8/2002 | Yoshida et al. | ............. 700/173 |
| 6,505,092 B1 | * | 1/2003 | Fukaya et al. | .............. 700/184 |
| 6,597,971 B1 | * | 7/2003 | Kanno | ......................... 700/245 |
| 6,671,568 B1 | * | 12/2003 | Gerken et al. | .............. 700/100 |
| 6,847,922 B1 | * | 1/2005 | Wampler, II | ................... 703/1 |
| 2001/0012973 A1 | * | 8/2001 | Wehrli et al. | ............... 700/193 |
| 2003/0171842 A1 | * | 9/2003 | Teramoto et al. | ........... 700/182 |

\* cited by examiner

*Primary Examiner*—Maria N. Von Buhr
(74) *Attorney, Agent, or Firm*—Lee & Hayes, PLLC

(57) ABSTRACT

A method and system for clamping a part in an automated tool to produce the part includes selecting a part for production on an automated tool driving a cutter. Deriving a clamping scenario defines the positioning of a plurality of clamps to fix the part to the automated tool. Generating a numeric controlled cutting program is based upon the part and the clamping scenario. Simulating the running of the numeric controlled program predicts interferences between the cutter and any of the plurality of clamps.

45 Claims, 7 Drawing Sheets

US 7,062,351 B2

CLAMP AVOIDANCE CUTTER PATH REGENERATION

FIELD OF THE INVENTION

This invention relates generally to manufacturing and, more specifically, to manufacturing information technology.

BACKGROUND OF THE INVENTION

In the production process, fixtures and clamps are set in place to stabilize a part during machining. Because of the need to clamp the part to provide adequate fixation with relation to a fixture plate, parts are often clamped with clamps placed at points that require machining. Numeric control (NC) files do not include optimal fixation points to assure that clamps will not occlude areas of the part from the machining cutter. Additionally, it is often not possible to fix the part to the plate without setting a clamp to occlude the part from the machining cutter.

In some applications, the clamp is partially or completely sacrificed to allow machining of the surface beneath the clamp after the clamp has served its duty for fixing the part during the machining of another portion of the part. Such sacrificial use of the clamps causes undue wear on the cutter and undue expense in providing clamps for sacrifice.

In other applications, the part is machined in two discrete steps. Each step entails a distinct set up and alignment of the part on the fixture plate. The distinct alignment for the second step makes producing a homogeneous machined surface very difficult. Additionally, the two-step process is not easily reproduceable.

As a result, there is an unmet need in the art for a method and system for optimal positioning of clamps for fixing a part to a fixture plate during machining of the part and allowing repositioning of the clamps for further machining without moving the part.

SUMMARY OF THE INVENTION

Embodiments of the present invention provide a method and system for clamping a part in an automated tool to produce the part. In an exemplary embodiment, a part is selected for production on an automated tool driving a cutter. A clamping scenario is derived that defines positioning of a plurality of clamps to fix the part to the automated tool. A numerically controlled cutting program is generated based upon the part and the clamping scenario. Simulating the running of the numeric controlled program predicts interferences between the cutter and any of the plurality of clamps.

According to an aspect of the present invention, a Graphical User Interface (GUI) allows interaction between the system and the user. The GUI allows the user to add or remove clamps, reposition existing clamps, add methods of avoidance and reentry and visually verify the motion created by the system and processing of the job.

Embodiments of the present invention may simulate the generated cutting path and the resulting motion of the cutter and the part to determine any interference between the cutter or machine structure and the clamps being used to secure the part. When interference is detected, the system will determine the location in work axis coordinates, the location in the program, the next position on the part for that motion, and the avoidance and reentry methods to be used. If no available avoidance or reentry method will satisfy the condition, the system will suspend operation and notify the operator. After determining the skip motion, the system will determine the material remaining to be removed and store the data for later operation.

According to another aspect of the present invention, after all cutting has been checked for the current part, the operator may utilize the GUI to relocate the clamps to avoid any uncut areas and execute the saved cutting information for those areas. All checks are run again for the relocated clamps and the operator is notified of any new conditions.

BRIEF DESCRIPTION OF THE DRAWINGS

The preferred and alternative embodiments of the present invention are described in detail below with reference to the following drawings.

DETAILED DESCRIPTION OF THE INVENTION

Embodiments of the present invention provide a method and system for clamping a part in an automated tool to produce the part. In an exemplary embodiment, a part is selected for production on an automated tool driving a cutter. A clamping scenario is derived that defines positioning of a plurality of clamps to fix the part to the automated tool. A numeric controlled cutting program is generated based upon the part and the clamping scenario. Simulating the running of the numeric controlled program predicts interferences between the cutter and any of the plurality of clamps.

The following discussion is intended to provide a general description of a suitable computing environment in which the invention may be implemented. While an exemplary embodiment of the invention will be described in the general context of an application program that runs on an operating system in conjunction with a personal computer and in connection with a server, those skilled in the art will readily recognize that embodiments of the present invention may also be implemented in combination with other program modules and on other platforms. Generally, program modules include routines, operating systems, application programs, components, data structures and the like that perform particular tasks or implement particular abstract data types. Moreover, those skilled in the art will appreciate that the present invention may be practiced with other computer system configurations, including hand-held devices, multi-processor systems, microprocessor based or programmable computer electronics, minicomputers, mainframe computers, and the like.

The present invention may also be practiced in distributed computing environments where tasks are performed by remote processing devices that are linked through a communications network. In a distributed computing environment, the program modules may be located in both local and remote memory storage devices. Execution of the program modules may occur locally in a stand-alone manner or remotely in a client/server manner. Examples of such distributed computing environments include local area networks of an office, enterprise wide computer networks, and the Internet.

Figure 1:
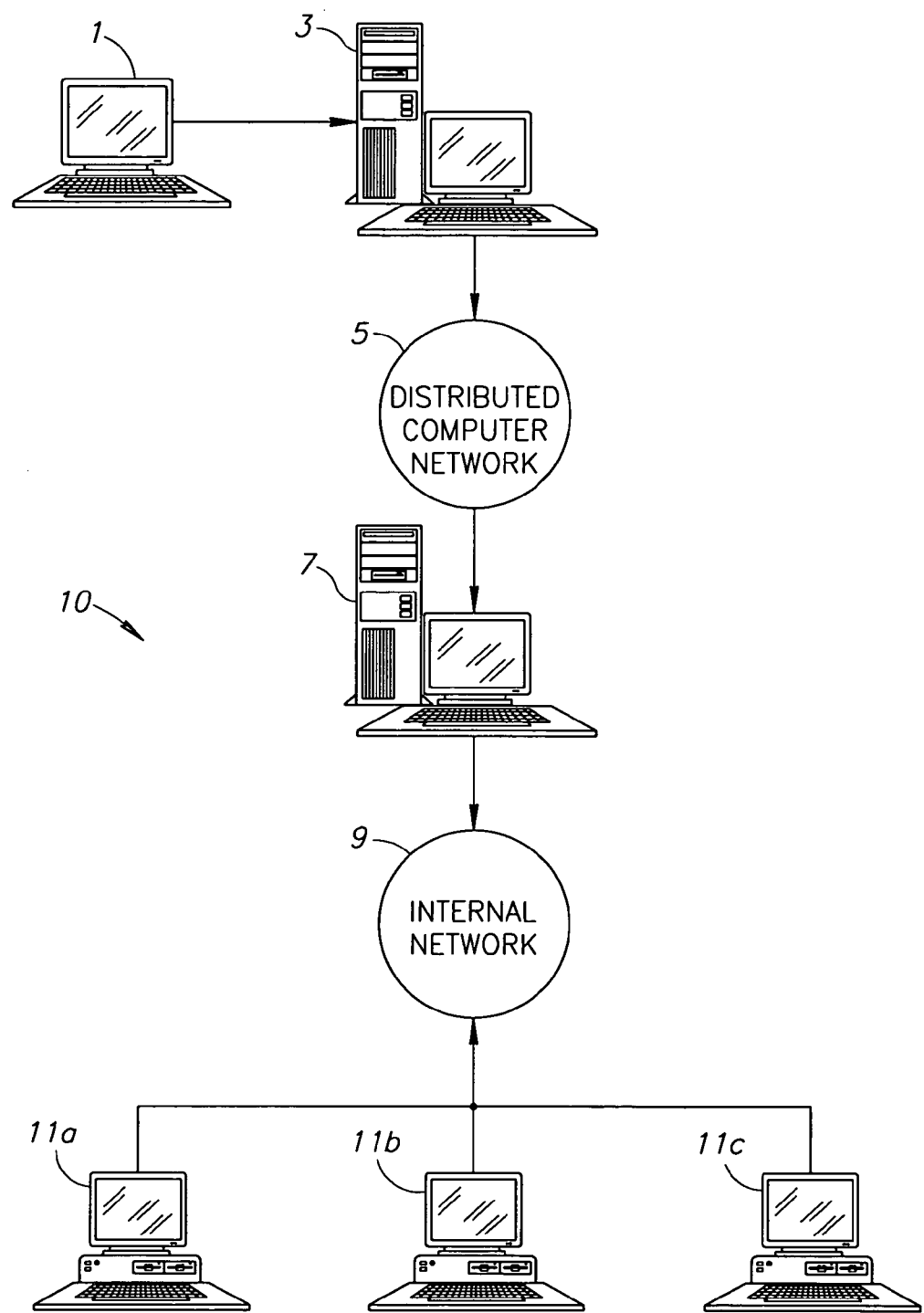
FIG. 1 is a diagram of a distributed computer network.

FIG. 1 illustrates a typical client/server environment 10 in which an exemplary embodiment of the present invention operates. A computer system or client 1 such as the conventional personal computer or any devices operable to communicate over a network is connected to an Internet server computer 3 ("server"). The server 3 is generally provided by an Internet service provider (ISP), which provides Internet access for a typical Internet user. The server 3 is connected to a distributed computer network, such as the Internet or a wide area network ("WAN"), and enables the client 1 to communicate via the distributed computer network 5.

The client 1 communicates via combination of the server 3 and the distributed computer network 5 to a server 7, such as communication or an email server. In an exemplary embodiment, servers 3 and 7 support email services, contain a message store for holding messages until delivery, and contain a translation facility or gateway for allowing users having different email programs to exchange mail. The server 7 is connected to an internal network 9, such as a local area network ("LAN") and enables the client 1 to communicate with the clients 11a, 11b, and 11c via the internal network 9.

The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. This information is retrieved by the server 3 and can be forwarded to the client 1, when requested by the client 1.

Figure 2:
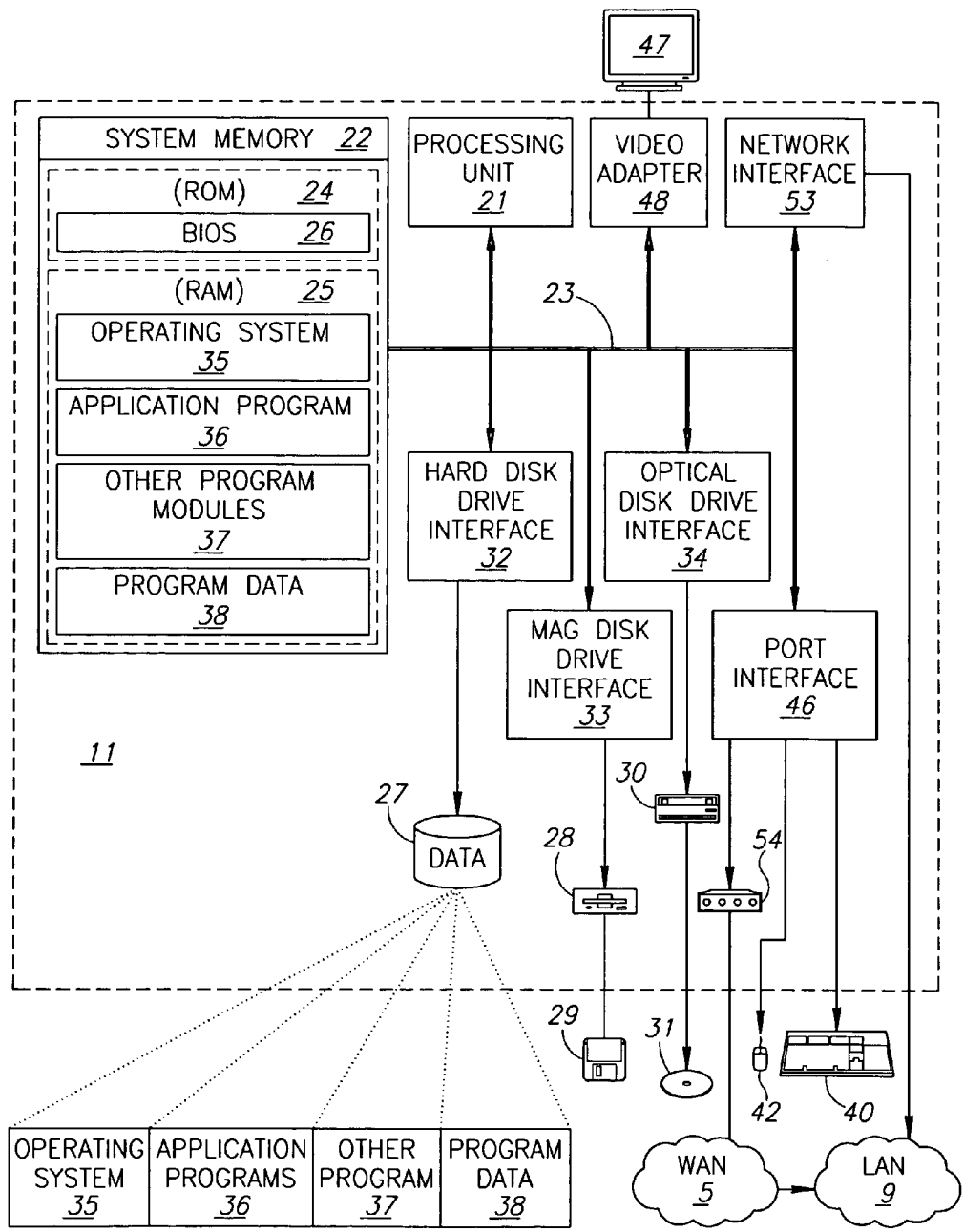
FIG. 2 is a block diagram of a client computer system on a computer network.

With reference to FIG. 2, an exemplary system for implementing the invention includes a conventional personal computer 11 that serves as a client. The client 11 may represent any or all of the clients 1, 11a, 11b, and 11c illustrated in FIG. 1. The client 11 includes a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing basic routines that help to transfer information between elements with the client 11 such as during startup is stored in ROM 24. The client 11 further includes a hard disk drive 27, a magnetic disk drive 28, e.g. to read from or write to a removable disk drive 29, an optical disk drive 30, a CD-ROM disk 31, or to read from or write to other media. The hard disk drive 27, the magnetic disk drive 28, and an optical disk drive 30 are connected to the system bus 23 by a hard disk drive interface 32, a magnetic disk drive interface 33, and an optical disk drive interface 34, respectively. The drives and their associated computer-readable media provide non-volatile storage for the client 11. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an email program module 36, other program modules, such as the message manager program module 37, a local message store 38, and a database 39 for supporting email applications. A user may enter commands and information into the client 11 through a keyboard 40 and a pointing device, such as a mouse 42. Other input devices (not shown) may include a pen, a touch operated device, a microphone, a joystick, a game pad, a satellite dish, a scanner, or the like. These and other input devices are often connected to the processing unit 21 through a port interface 46 that is coupled to the system bus, but may be connected by other interfaces, such as a serial port, a game port, or a universal serial bus (USB). A monitor 47 or other type of display device is also connected to the system bus 23 via an interface, such as the Video Adaptor 48. In addition to the monitor, personal computers typically include other peripheral output devices (not shown), such as speakers or printers.

The client 11 operates typically in a networked environment using logical connections to one or more remote computers, such as the remote computer 49. The remote computer 49 may be an email server (which includes one or more message stores), as described above in connection with FIG. 1. A file server (which includes one or more files stores), a router, a peer device or other common network node, and typically includes many or all of the elements described relative to the client 11. The logical connections depicted in FIG. 2 include the local area network (LAN) 9 or the wide area network (WAN) 5. Such networking environments are commonplace in offices, enterprise wide computer networks, intranets, and the Internet. When used in a LAN networking environment, the client 11 is connected to the LAN 9 through a network interface 53 or additionally through the WAN 5. When used in a WAN networking environment, the client 11 typically includes a modem 54 or other means for establishing communications over the WAN 5 such as the Internet. The modem 54 which may be internal or external is connected to the system bus 23 via the serial port interface 46. In a networked environment, the program modules depicted relative to the client 11, or portions thereof, may be stored in the remote memory storage device. It will be appreciated that the network connections shown are exemplary in other means of establishing a communications link between the computers may be used.

Figure 3:
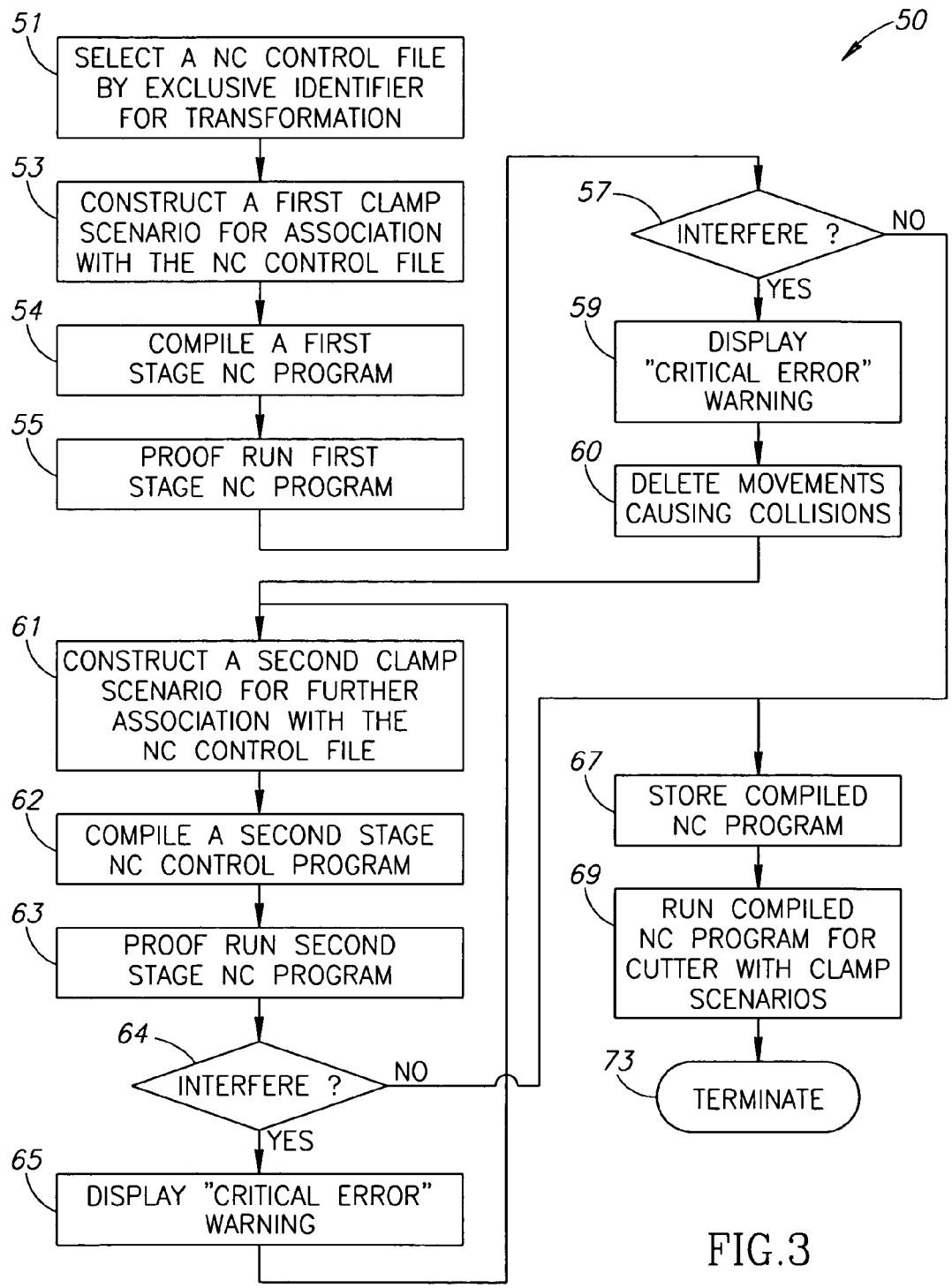
FIG. 3 is a flow chart of a method for generating NC programs.

Referring to FIGS. 1, 2, and 3, a method 50 for generating a clamp-avoiding machining routine begins at a block 51 wherein a program, known as an NC control file, for machining a desired part is selected. A first stage NC control file is for the purpose of achieving as much of the machining with a first clamping scenario as possible without interfering with the clamps as set forth in the first clamping scenario. In a presently preferred embodiment, a user may select the NC control file from an active service page on either the LAN 9 or the WAN 5. However, the NC control file might be stored as well on local memory such as system memory 22, the magnetic disk 27, a floppy disk 29, a CD ROM 31, or any other suitable computer-readable memory medium.

The NC control file contains a numeric definition of the part to be machined. The numeric definition includes data describing surfaces to be machined, thereby indicating the removal of material (such as the milling of cast parts to define a mating surface with other parts in an assembly). The NC control file generally does not contain instructions to a machine to effect the removal of the material. For instance, the NC control file does not include approach angles for a cutter or the movements of a cutter across the part. Instead, these instructions are generated from the NC control file.

At a block 53, to assist in the generation of an instruction set known as an NC program, a user will place clamps in suitable positions to fix the part against a plate for machining. The clamps are generally metal fingers affixed to the plate with threaded fasteners. The user may configure a clamping scenario by moving clamps around a periphery of a displayed part by manipulating a pointing device, such as a mouse or the like. Alternatively, the user may recall a stored placement of clamps from a storage address within the network as the user recalled the NC control file. Alternatively, the user may allow the computer to place clamps based upon the NC control file. Placement of the clamps is known as a clamping scenario and is generally stored in association with the NC program.

At a block 54, once a clamping scenario is stored in association with the NC control file, a first stage NC program is compiled. Compiling the NC program is according the physical lay-out of the part and the clamps and taking into consideration the movement of the cutter in space and possible movement of the part on the plate.

Compiling the NC program at the block 54 produces an executable code defining a set of movements for machining the part. For example, when a five-axis cutter is used, the cutter has five actuators to move the cutter in relation to the part. Some of these actuators may be dedicated to movement of an end effector holding the cutter while others are dedicated to moving the plate to expose other aspects of the part to the cutter. A toolbox of standardized movement instructions may be associated with a particular machine, and the toolbox contains several known subroutines for movement of the cutter and the part to machine a surface. Each movement of the cutter is associated with a swept section of the part such that the movement causes the machining of the part over the associated swept section.

At a block 55, the first stage NC program is proof run. The proof run suitably is performed in a three-dimensional, virtual-reality setting. The purpose of proof running the NC program is to determine if there is suitable clearance to machine the part defined by the NC control file. Where the cutter cannot clear the clamp to achieve some of the desired machining of the part, an interference between the cutter and clamp is said to occur.

At a decision block 57, any interferences are detected. Where no interferences occur, the compiled NC program with the attendant clamping scenario is deemed valid and stored at a block 67.

If an interference is detected, a "critical error" warning is generated at a block 59 to inform the user that the interference or interferences has occurred. The critical error is associated with the movement that caused the critical error when the critical error warning is generated.

At a block 60, the movements that caused interferences and that are associated with the critical errors are removed from the compiled NC program. Because of the further association between the movements and the swept sections, the deleted movements and defined swept sections define an unmachined remainder of the part. Because an unmachined remainder of the part exists, further action is necessary to complete the part.

At a block 61, identifying the unmachined remainder allows the user to formulate a second clamping scenario. With the unmachined remainder identified, the user selects a second clamping scenario. As with the generation of the first clamping scenario, those skilled in the art will readily appreciate that in the second clamping scenario the clamps may be placed by several suitable means informed by the location of the unmachined remainder of the part. A suitable second clamping scenario is generated by suitable means at the block 61.

At a block 62, a second stage NC control program is generated to machine the unmachined remainder of the part. The second clamping scenario has exposed any former interference sites to access by the cutter and the second stage NC program will suitably finish machining the part.

At a block 63, a proof run of the second stage NC program is executed to enable the unmachined remainder to be machined without interference. As at the block 55, the proof run suitably is performed in a three-dimensional, virtual-reality environment.

At a block 64, if an interference should occur, another critical warning is generated at a block 65. As a result of the interference, the method 50 loops back to the block 61 to generate an alternative second clamp scenario.

If, on the other hand, no interference is noted in the second proof run, the method 50 advances to the block 67 where the first and second stages of the NC program are stored as a single compiled NC program. The NC program includes the associated clamping scenarios and, as such, is a complete instruction set for the machining of the part.

At a block 69, the compiled NC program is run to produce one or more machined parts. Because of the repeatable nature of the NC program as now compiled, the process becomes automated and does not entail further examination or configuration of the clamping scenarios. When the appropriate number of parts has been machined, the method 50 terminates at a block 73.

Figure 4A:
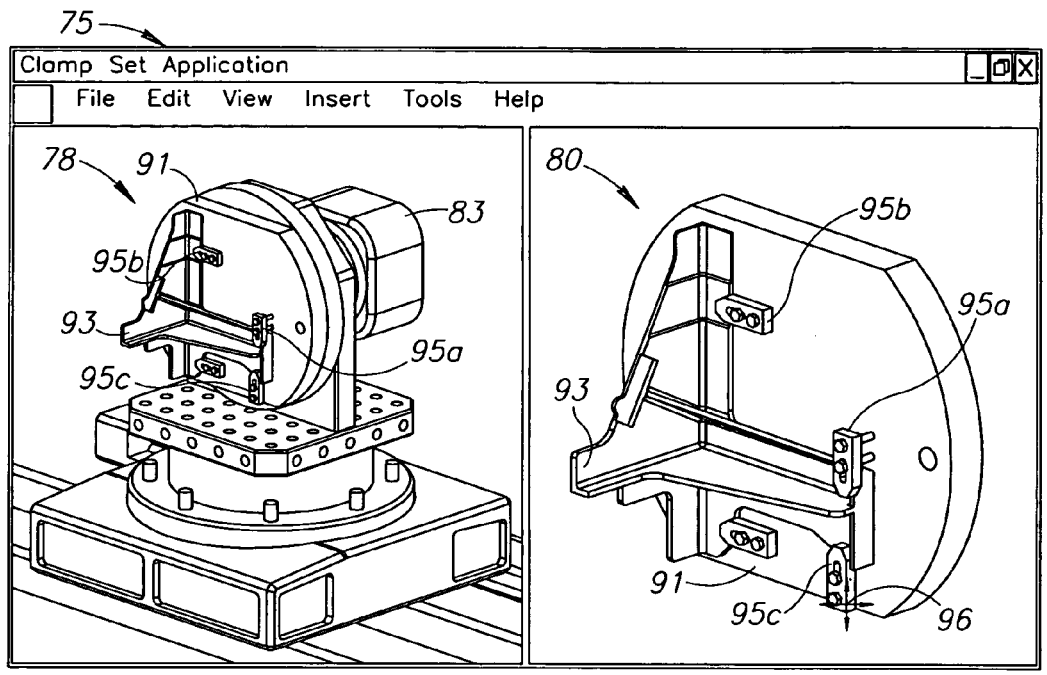
FIG. 4A is a diagram of a graphic user interface used to generate a first clamping scenario.

Referring to FIG. 4A, a software application for machining and clamp placement generates an exemplary graphic user interface 75 for interaction with the user. The graphic user interface 75 includes a split screen showing a first screen displaying a perspective view of the part on the machining tool 83 and a tool view pane 78. The tool view pane 78 may be generated or it may be a real time camera image ported onto the display. Along with the tool 83, the tool view pane 78 includes the part 93, clamps 95a, 95b, and 95c, and a plate 91. When appropriate, the tool view pane 78 includes the cutter (not shown) rotating in a chuck in an end effector (not shown). When the view of the part generated by the user interface rather than ported as a video feed, the part definition contained in an NC control file is used to generate a perspective view. In either embodiment, the view visible from the tool view pane 78 is a "machinist's eye view."

The graphic user interface 75 also includes a part view pane 80. The part view pane 80 is a perspective view that is limited to showing the part 93, the clamps 95a, 95b, and 95c, the plate 91 and, when appropriate, a cutter (not shown). The part view pane 80 is uncluttered by additional details, such as the end effector and other parts, that might obscure the view of the action of the cutter on the part. The part view pane 80 displays details of the part 93 that would not be viewable in the tool view pane 78.

The part view pane 80 is also advantageously used to generate a clamping scenario in one presently preferred embodiment. A mouse pointer 96 is advantageously used to change clamping locations used for fixing the part 93 to the plate 91. As shown, the mouse pointer 96 is in movement mode, such as the rectilinear mode for moving the clamp vertically and horizontally in a plane parallel to the plate 91. A second mode (not shown) allows rotation of the clamp within the same plane.

Figure 4B:
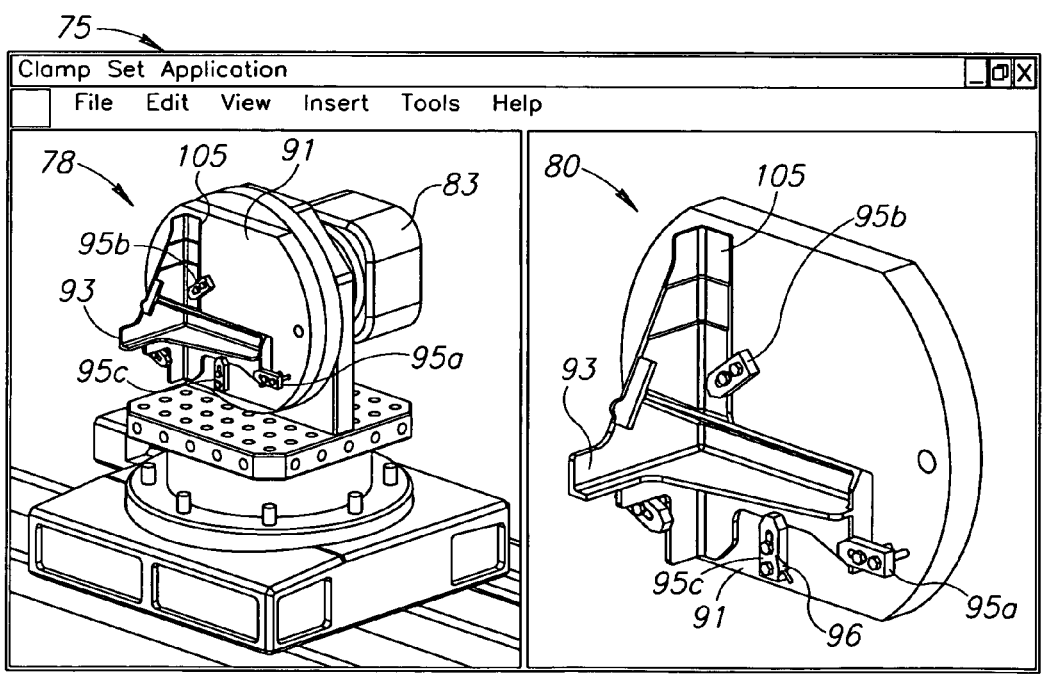
FIG. 4B is a diagram of a graphic user interface used to generate a second clamping scenario.

Referring to FIG. 4B, the part view plane 80 displays the part for purposes of configuring the second clamping scenario. Both the part view pane 80 and the tool view pane 78 include the part 93, clamps 95a, 95b, and 95c, a plate 91, and a second machining surface 105. Additionally, the tool view pane includes the tool 83. The part view pane 80 shows the mouse pointer 96 as it moves to designate or "click on" the clamp 95c. Before clicking on the clamp 95c, the mouse pointer 96 does not show additional arrows indicative of entering the rectilinear mode. Because of the presence of the second machining surface 105 on the part 93, the graphic user interface 75 is used to set up the second clamping scenario.

Figure 5A:
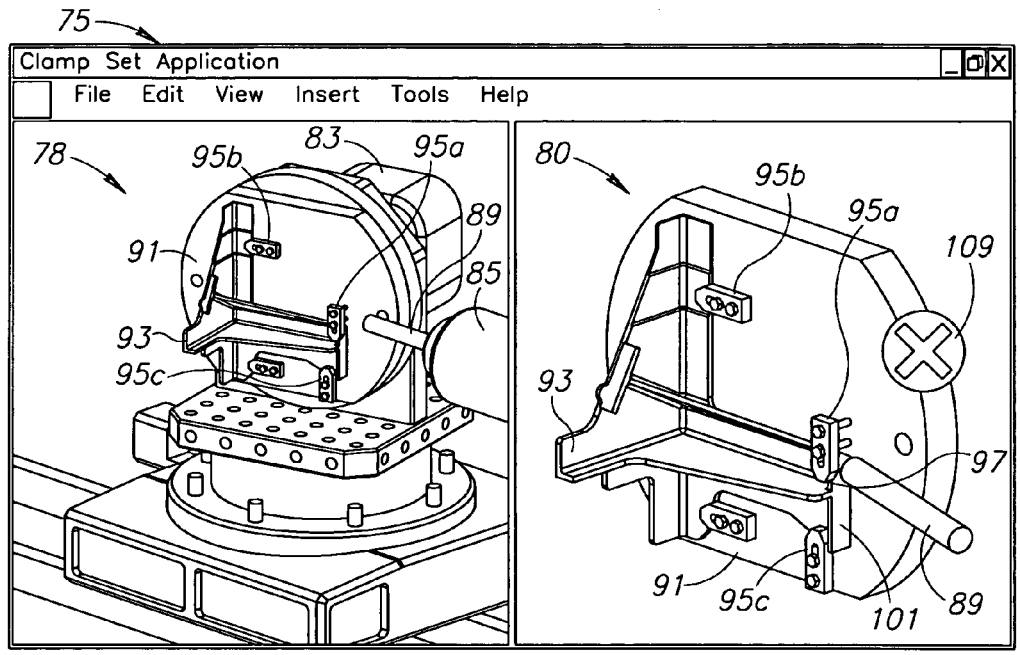
FIG. 5A is a diagram of a graphic user interface indicating a critical error in a first stage of a numeric control instruction set.

Referring to FIG. 5A, the graphic user interface 75 is used to proof run a clamping scenario. The tool view pane 80 includes the tool 83, the part 93, the clamps 95a, 95b, and 95c, the plate 91 as well as the cutter 89 mounted in the end effector 85. In the tool view pane 80, the part 93, the clamps 95a, 95b, and 95c, the plate 91, as well as the cutter 89 are shown. Additionally, however, the part view pane 80 shows the part as the cutter 89 collides with the clamp 95a, thereby generating a "critical error" warning 109 during the proof run. To aid in the assessment of the interference, an actual damage area 97 is also generated in the part view pane 80. This allows the operator to associate the actual damage area 97 visually as the movement is electronically associated with the movement causing the "critical error" warning 109.

Figure 5B:
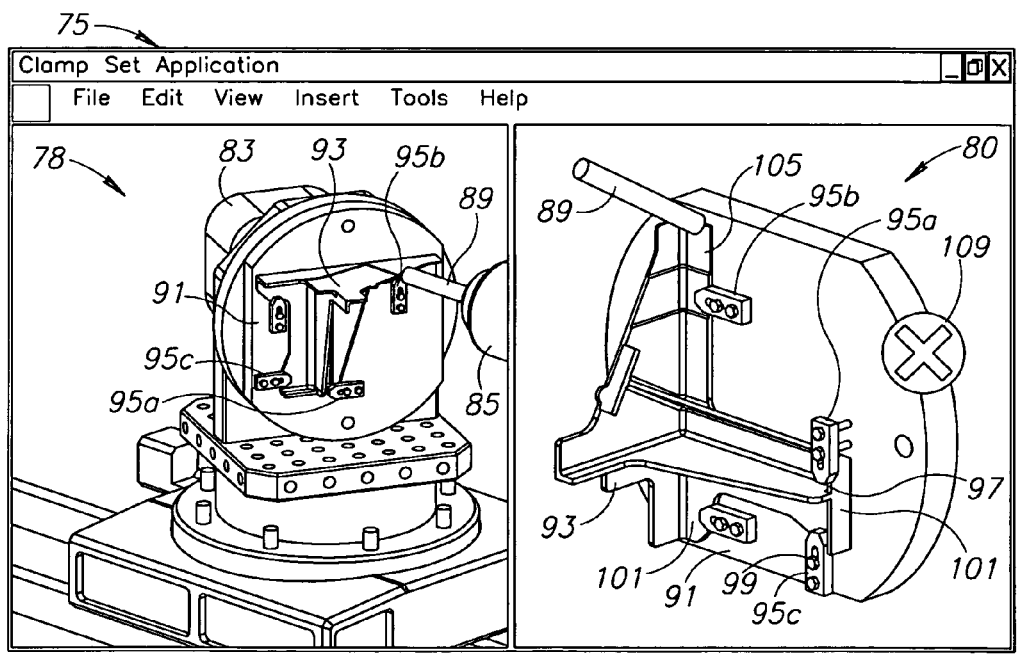
FIG. 5B is a diagram of a graphic user interface indicating a critical error in a second stage of a numeric control instruction set.

Referring to FIGS. 5A and 5B, a second critical warning 109 is shown in the graphic user interface 75 of FIG. 5B. The second "critical error" warning 109 demonstrates a virtue of the graphic user interface 75 in its split frame mode. The tool view pane 78 shows the part 93, the clamps 95a, 95b, and 95c, the plate 91, as well as the cutter 89. To facilitate machining of the part 93, the tool 83 has rotated the plate 91 a quarter turn in a clockwise direction. As a result, a ridge of the part 93 obscures the point where the cutter 89 contacts the part 93. In the part view pane 80, the contact is clearly visible. This is because rather than rotate the plate 91 to remain faithful to a "machinist's eye view," the part view pane 80 displaces the cutter 89, thereby leaving the part oriented for optimal viewing.

In the part view pane 80, to aid in the assessment of the interference, the second machining surface 105 is shown indicating contact with the clamp 95b. An image showing the damage to the clamp is generated in the part view pane 80, thereby allowing the operator to associate the second machined area 105 visually as the movement is electronically associated with the movement causing the "critical error" warning 109. In one presently preferred embodiment, the damage to the clamps 95a, 95b, and 95c accumulates in the part view pane 80 to indicate to the user the extent of the second stage NC control program necessary to complete the part.

Figure 6A:
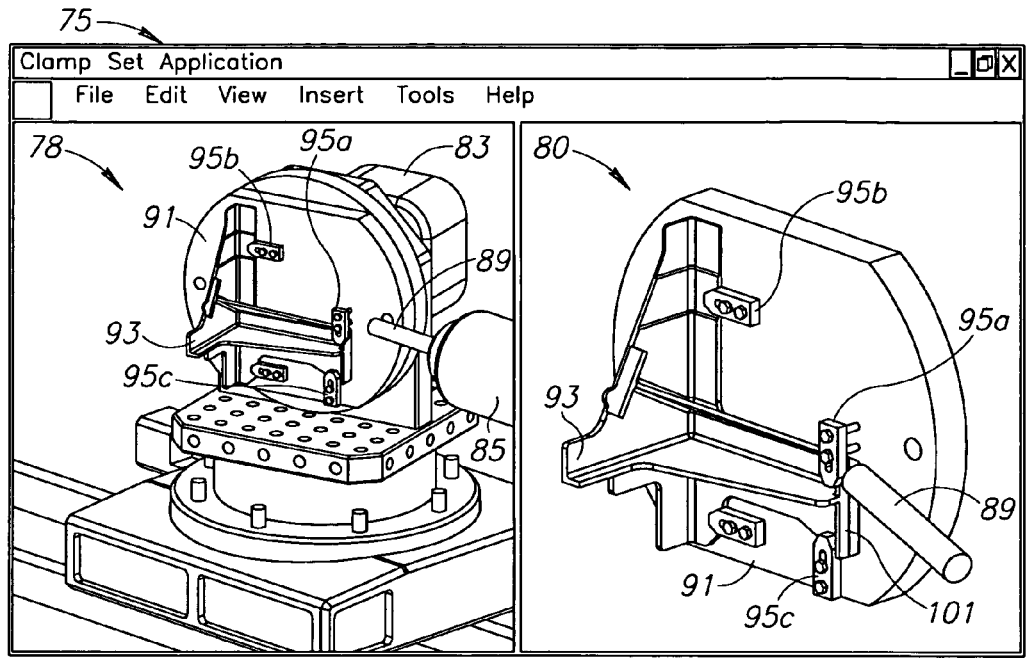
FIG. 6A is a diagram of a graphic user interface indicating execution of a first phase of the first stage of a numeric control instruction set.
Figure 6B:
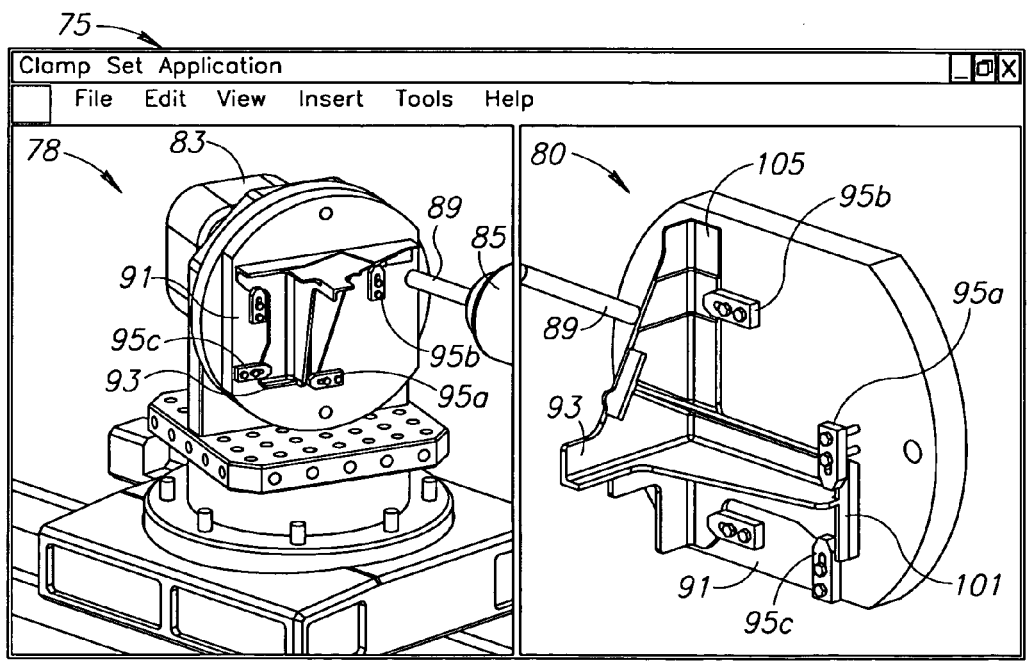
FIG. 6B is a diagram of a graphic user interface indicating execution of a second phase of the first stage of a numeric control instruction set.

Referring to FIGS. 6A and 6B, the graphic user interface 75 indicates actual execution of the first stage NC control program. As before, the graphic user interface 75 includes both the part view pane 80 and the tool view pane 78 including the tool 83, the cutter 89, the part 93, clamps 95a, 95b, and 95c, and the plate 91. Additionally, the tool view pane 78 includes the tool 83 and the end effector 85. FIG. 6A shows the graphic user interface 75 as the cutter 89 machines a first surface 101 on the part 93 and stops short of the clamp 95a.

In FIG. 6B, the cutter 89 has moved to machine the second machining surface 105. The second machining surface 105 is sufficiently removed from the clamp 95b so no interference has occurred. The execution of stage one of the NC program is now complete. In one presently preferred embodiment, the tool view pane 78 is a generated image rather than a live image. However, a live image may be suitably ported onto the tool view pane 78 rather than the generated view.

Figure 7A:
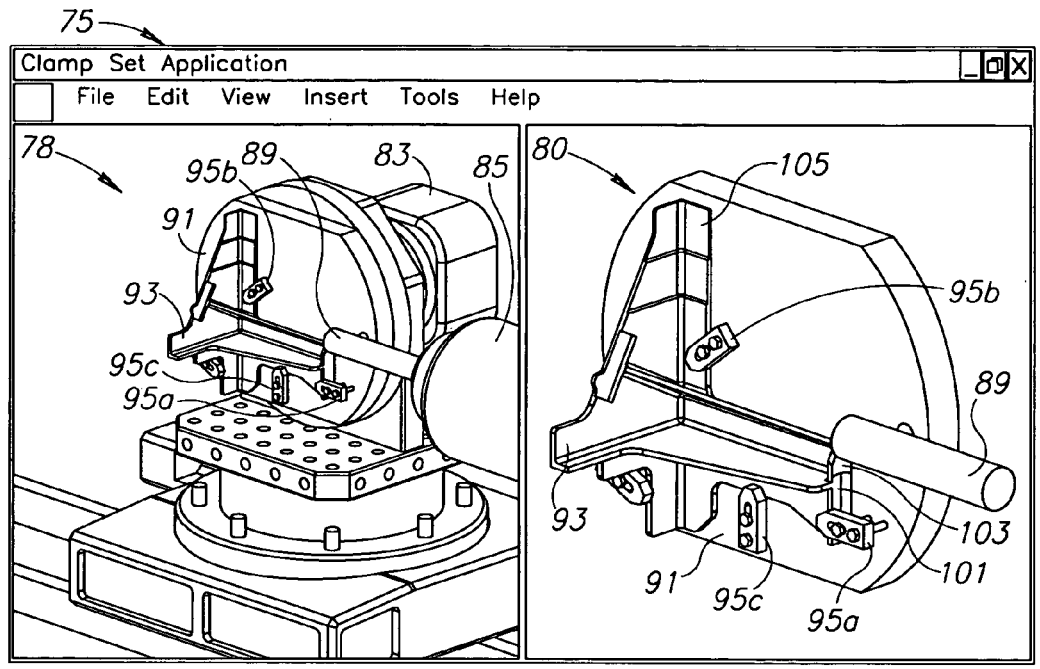
FIG. 7A is a diagram of a graphic user interface indicating execution of a first phase of the second stage of a numeric control instruction set.
Figure 7B:
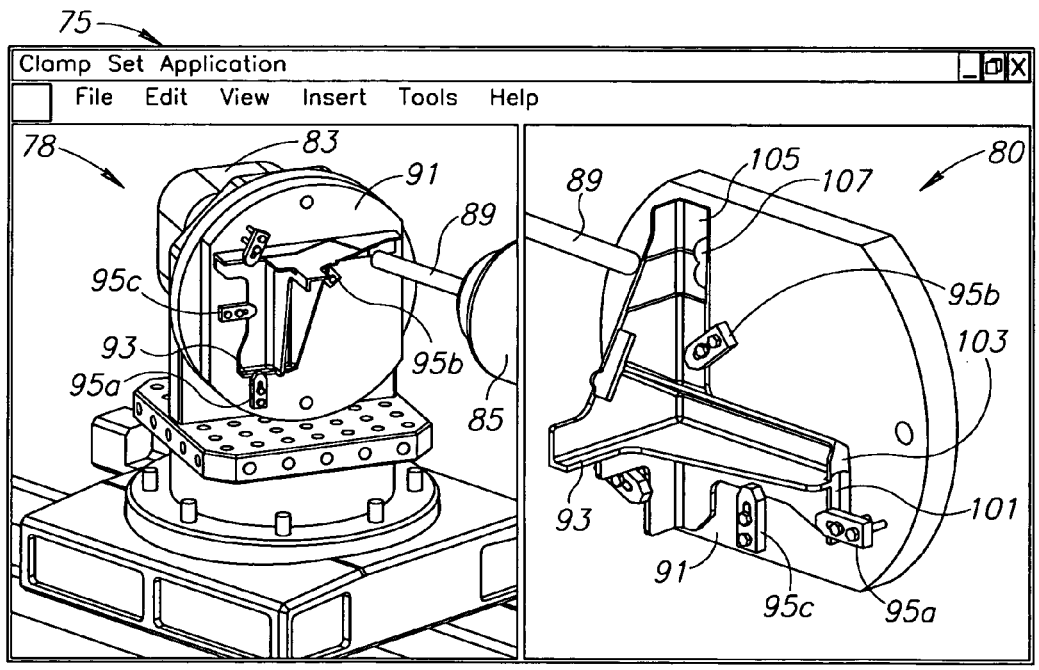
FIG. 7B is a diagram of a graphic user interface indicating execution of a second phase of the second stage of a numeric control instruction set.

Referring to FIGS. 7A and 7B, the graphic user interface 75 indicates actual execution of the second stage NC control program. As before, the graphic user interface 75 includes both the part view pane 80 and the tool view pane 78 including the tool 83, the cutter 89, the part 93, clamps 95a, 95b, and 95c, and the plate 91. Additionally, the tool view pane 78 includes the tool 83 and the end effector 85. In contrast to FIG. 6A, FIG. 7A shows the second clamping scenario. Both of the clamps 95a and 95b have been repositioned or moved to expose areas of the part 93 that they previously covered. The clamp 95c remains in its former position because it covered none of the part that is to be machined.

FIG. 7A shows the graphic user interface 75 as the cutter 89 machines a remainder of the first surface 103 on the part 93, thereby machining the area formerly covered by the clamp 95a. The clamp 95a has been positioned suitably close to the remainder of the first surface 103 to provide adequate fixation to the plate 91 during machining of the remainder of the first surface 103.

In FIG. 7B, the cutter 89 has moved to machine the remainder of a second machining surface 107. The remainder of the second machining surface 107 is now available for machining by the cutter 89 because the clamp 95b has been suitably repositioned in the second clamping scenario so no interference has occurred. The execution of stage two of the NC program is now complete. In a presently preferred embodiment, the tool view pane 78 suitably is a generated image rather than a live image. However, a live image may be suitably ported onto the tool view pane 78 rather than the generated view.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for clamping a part in an automated tool to produce the part, the method comprising:
    selecting a part for production on an automated tool configured to drive a cutter;
    deriving a clamping scenario for positioning a plurality of clamps to fix the part to the automated tool;
    generating a numeric controlled cutting program based upon the part and the clamping scenario; and
    automatically predicting interferences between the cutter and any of the plurality of clamps.

2. The method of claim 1, wherein automatically predicting includes simulating running of the numeric controlled program.

3. The method of claim 1, wherein selecting a part for production includes selecting a previously-associated numeric model of the part.

4. The method of claim 1, wherein the numeric controlled cutting program is generated by a CAD/CAM program.

5. The method of claim 1, further comprising fabricating the part.

6. The method of claim 1, wherein deriving a clamping scenario includes deriving a first clamping scenario and a second clamping scenario.

7. The method of claim 6, wherein generating a numeric controlled cutting program includes generating a first stage numeric controlled cutting program and a second stage numeric cutting program, the first stage numeric controlled cutting program including movement of the cutter with clamps positioned according to the first clamping scenario and the second stage numeric controlled cutting program including movement of the cutter with clamps positioned according to the second clamping scenario.

8. The method of claim 7, wherein generating a numeric controlled cutting program includes transitioning one or more of the plurality of clamps from positions defined in the first clamping scenario to positions defined in the second clamping scenario.

9. The method of claim 8, wherein simulating the running of the numeric controlled program includes:
    rederiving the first stage numeric controlled program if simulating indicates a movement causing an interference between the cutter and any of the plurality of clamps to remove the movement from the first stage numeric controlled program; and
    rederiving the second stage numeric controlled program to include the movement in the second stage numeric controlled program.

10. The method of claim 8, wherein deriving the second clamping scenario facilitates the second stage numeric controlled program.

11. A software product stored on a computer readable medium, the software product for commencing an executable instruction set directing an automated tool to machine a part, the software product comprising:
    a user-interface stored at a first addressable memory site within a network, the interface including:
        a first software component configured to select a part for production on an automated tool configured to drive a cutter;
        a second software component configured to derive a clamping scenario for positioning a plurality of clamps to fix the part to the automated tool;
        a third software component configured to generate a numeric controlled cutting program based upon the part and the clamping scenario; and
        a fourth software component configured to automatically predict interferences between the cutter and any of the plurality of clamps.

12. The software product of claim 11, wherein the fourth software component is configured to predict interferences by simulating the running of the numeric controlled program.

13. The software product of claim 11, wherein the third software component is further configured for storing the executable instruction set at an addressable memory site within a network.

14. The software product of claim 11, wherein the generating of the numeric controlled cutting program is generated by a CAD/CAM program.

15. The software product of claim 11, wherein the user-interface further includes a fourth software component configured to initiate the executable program on the automated tool.

16. The software product of claim 11, wherein the clamping scenario includes a first clamping scenario and a second clamping scenario.

17. The software product of claim 16, wherein the generating a numeric controlled cutting program includes generating a first stage numeric controlled cutting program and a second stage numeric cutting program, the first stage numeric controlled cutting program including movement of the cutter with clamps positioned according to the first clamping scenario and the second stage numeric controlled cutting program including movement of the cutter with clamps positioned according to the second clamping scenario.

18. The software product of claim 17, wherein the generating a numeric controlled cutting program includes transitioning one or more of the plurality of clamps from positions defined in the first clamping scenario to positions defined in the second clamping scenario.

19. The software product of claim 18, fourth computer software component is further configured to:
    rederiving the first stage numeric controlled program if the simulating indicates a movement causing an interference between the cutter and any of the plurality of clamps to remove the movement from the first stage numeric controlled program; and
    rederiving the second stage numeric controlled program to include the movement in the second stage numeric controlled program.

20. A tool for automatically milling a part, the tool comprising:
    a controllable end effector having a chuck configured to accept a cutter, the end effector being configured to mill a part; and
    a central processing unit operationally coupled to the end effector, the central processing unit including:
        an addressable memory; and
        a user-interface stored at a first addressable memory site within the addressable memory, the interface including:
            a first software component configured to select a first clamping scenario, the first clamping scenario being stored at a second addressable site within the addressable memory in association with the identity of the cutter;
            a second software component configured to select a name of a part for production, a numeric model of the part being stored at a third addressable site within the addressable memory in association with the name; and
            a third software component configured to generate a first executable instruction set based upon the clamping scenario and the selected part and associated numeric model, the third software component being further configured to initiate the first executable program for simulation on the automated tool, the third software component being stored at a fourth addressable site within the addressable memory.

21. The tool of claim 20, wherein the numeric controlled cutting program is generated by a CAD/CAM program.

22. The tool of claim 19, wherein the user-interface further includes a fourth software component configured to initiate the executable program on the automated tool.

23. The tool of claim 19, wherein the memory sites includes sites within an addressable network.

24. The tool of claim 23, wherein the addressable network includes the Internet.

25. The tool of claim 19, wherein the third software component is further configured to simulate the movement of the end effector in three-dimensioned space.

26. The tool of claim 23, wherein the third software component is further configured to:

indicate an instruction that results in an interference between the cutter and one of the plurality of clamps; and delete the instruction from the first executable instruction set.

27. The tool of claim 24, wherein:

the first software component is further configured to select a second clamping scenario; and the third software component is further configured to generate a second executable instruction set including the instruction deleted from the first executable instruction set.

28. A tool for automatically milling a part, the tool comprising:

a central processing unit; and a graphic user interface, the graphic user interface including:

a user interface; and a software program to run on the central processing unit and to receive signals from the user interface, the software including:

a first software component configured to select a part for production on an automated tool configured to drive a cutter;

a second software component configured to deriving a clamping scenario for positioning a plurality of clamps to fix the part to the automated tool;

a third software component configured to generate a numeric controlled cutting program based upon the part and the clamping scenario; and a fourth software component configured to automatically predict interferences between the cutter and any of the plurality of clamps.

29. The tool of claim 28, further including a controllable end effector having a chuck configured to accept a cutter, the end effector being configured to mill a part and operationally coupled to the central processing unit.

30. The tool of claim 28, wherein automatically predicting includes simulating running of the numeric controlled program.

31. The tool of claim 28, wherein selecting a part for production includes selecting a previously-associated numeric model of the part.

32. The tool of claim 28, wherein the numeric controlled cutting program is generated by a CAD/CAM program.

33. The tool of claim 28, the software program further includes a fifth software component configured to control the end effector according to the numeric controlled program to fabricating the part.

34. The tool of claim 28, wherein deriving a clamping scenario includes deriving a first clamping scenario and a second clamping scenario.

35. The tool of claim 34, wherein generating a numeric controlled cutting program includes generating a first stage numeric controlled cutting program and a second stage numeric cutting program, the first stage numeric controlled cutting program including movement of the cutter with clamps positioned according to the first clamping scenario and the second stage numeric controlled cutting program including movement of the cutter with clamps positioned according to the second clamping scenario.

36. The tool of claim 35, wherein generating a numeric controlled cutting program includes transitioning one or more of the plurality of clamps from positions defined in the first clamping scenario to positions defined in the second clamping scenario.

37. The tool of claim 36, wherein simulating the running of the numeric controlled program includes:

rederiving the first stage numeric controlled program if simulating indicates a movement causing an interference between the cutter and any of the plurality of clamps to remove the movement from the first stage numeric controlled program; and rederiving the second stage numeric controlled program to include the movement in the second stage numeric controlled program.

38. The method of claim 37, wherein deriving the second clamping scenario facilitates the second stage numeric controlled program.

39. A tool for automatically milling a part, the tool comprising:

a controllable cutter; and a central processing unit operationally coupled to the controllable cutter, the central processing unit including:

an addressable memory;

a user interface; and a graphic user interface software component stored at a first addressable memory site within the addressable memory; the graphic user interface configured to run on the central processing unit and to receive signals from the user interface, the software including a first software component configured to select a part for production on an automated tool configured to drive the cutter responsive to signals from the user interface;

a second software component configured to deriving a clamping scenario for positioning a plurality of clamps to fix the part to the automated tool responsive to signals from the user interface;

a third software component configured to generate a numeric controlled cutting program based upon the part and the clamping scenario responsive to signals from the user interface; and a fourth software component configured to automatically predict interferences between the cutter and any of the plurality of clamps.

40. The tool of claim 39, wherein automatically predicting includes simulating running of the numeric controlled program.

41. The tool of claim 39, wherein selecting a part for production includes selecting a previously-associated numeric model of the part.

42. The tool of claim 39, the software program further includes a fifth software component configured to control the cutter according to the numeric controlled program to fabricating the part.

43. The tool of claim 39, wherein deriving a clamping scenario includes deriving a first clamping scenario and a second clamping scenario.

44. The tool of claim 39, wherein generating a numeric controlled cutting program includes generating a first stage numeric controlled cutting program and a second stage numeric cutting program, the first stage numeric controlled cutting program including movement of the cutter with clamps positioned according to the first clamping scenario and the second stage numeric controlled cutting program including movement of the cutter with clamps positioned according to the second clamping scenario.

45. The tool of claim 39, wherein generating a numeric controlled cutting program includes transitioning one or more of the plurality of clamps from positions defined in the first clamping scenario to positions defined in the second clamping scenario.

* * * * *